United States Patent
Wu

(10) Patent No.: US 8,624,522 B2
(45) Date of Patent: Jan. 7, 2014

(54) BACKLIGHT CONTROL CIRCUIT

(75) Inventor: Fan Wu, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 168 days.

(21) Appl. No.: 13/085,440

(22) Filed: Apr. 12, 2011

(65) Prior Publication Data

US 2012/0161646 A1    Jun. 28, 2012

(30) Foreign Application Priority Data

Dec. 22, 2010    (CN) .......................... 2010 1 0600691

(51) Int. Cl.
*G05F 1/00* (2006.01)

(52) U.S. Cl.
USPC .......................................................... 315/291

(58) Field of Classification Search
USPC .................................................. 315/157, 291
See application file for complete search history.

(56) References Cited

U.S. PATENT DOCUMENTS

2009/0262063 A1*  10/2009  Fujine et al. .................. 345/102

* cited by examiner

*Primary Examiner* — Thienvu Tran
(74) *Attorney, Agent, or Firm* — Altis Law Group, Inc.

(57) ABSTRACT

A backlight control circuit includes a driver circuit, a sensing circuit, and a control circuit. The driver circuit adjusts an illumination intensity of a backlight source. The sensing circuit senses an environmental illumination intensity. The control circuit is set between the driver circuit and the sensing circuit. The control circuit controls the driver circuit to adjust an illumination intensity of a backlight source according to the sensed environmental illumination intensity.

10 Claims, 1 Drawing Sheet

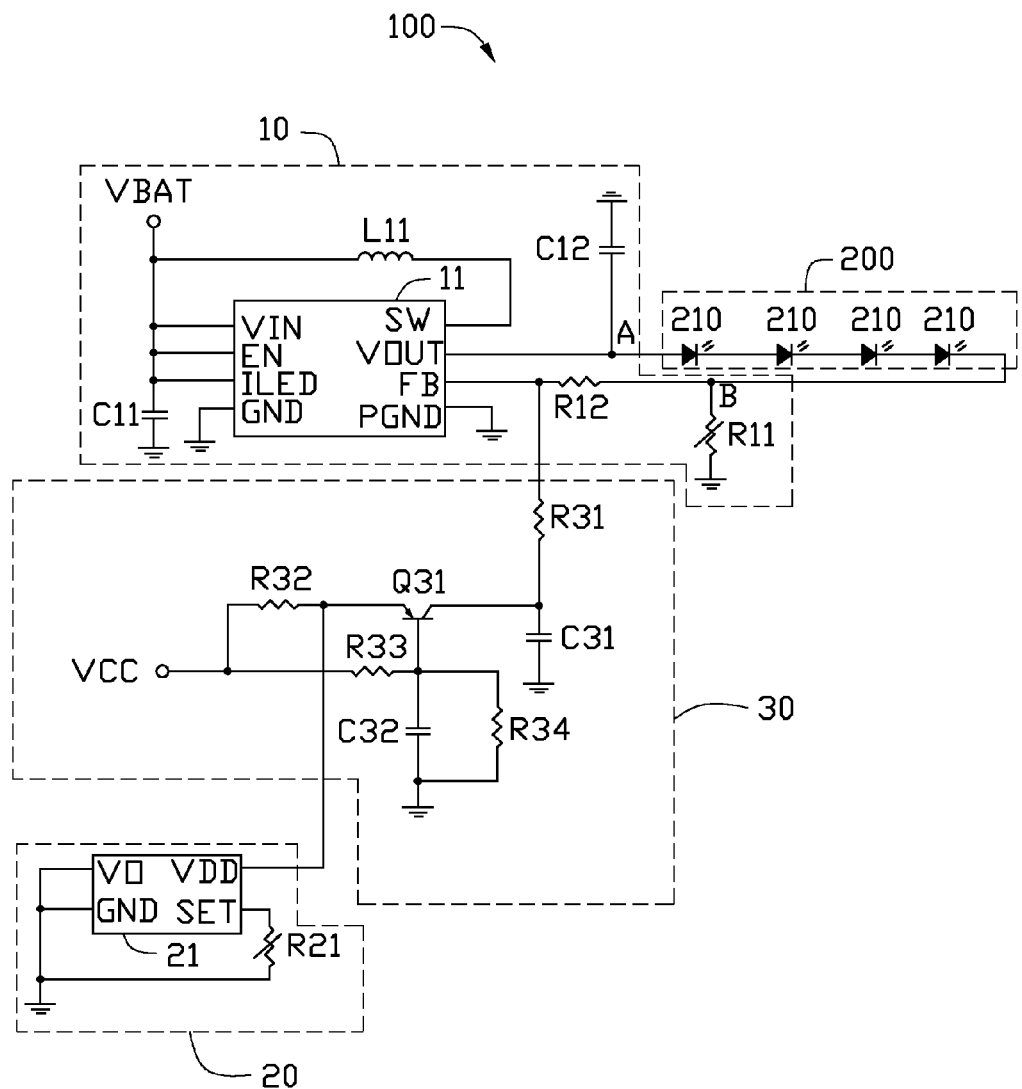

BACKLIGHT CONTROL CIRCUIT

BACKGROUND

1. Technical Field

The disclosure generally relates to display control circuits, and particularly to a backlight control circuit which can automatically adjust an illumination intensity of a backlight source of a portable electronic device according to environmental illumination intensity.

2. Description of Related Art

Many displays for portable electronic devices such as a mobile phone or a personal digital assistant (PDA) include a backlight module for enhancing the visibility of information presented on the display. The illumination intensity of the backlight module is commonly set to be a moderate level to clearly display the information. However, when the environmental illumination intensity of the display is strong, the information of the display may be difficult to read; when the environmental illumination intensity of the display is weak, it will be a waste of power if the backlight module still illuminates at a moderate level.

Therefore, there is room for improvement within the art.

BRIEF DESCRIPTION OF THE DRAWINGS

Many aspects of the present embodiment can be better understood with reference to the following drawings. The components in the drawings are not necessarily drawn to scale, the emphasis instead being placed upon clearly illustrating the principles of the present embodiment.

The FIGURE is a circuit diagram of a backlight control circuit used to adjust light intensity of a backlight module, according to an exemplary embodiment.

DETAILED DESCRIPTION

The FIGURE shows a backlight control circuit 100 used to adjust an illumination intensity of a backlight source 200 of a display, according to an exemplary embodiment. The backlight control circuit 100 includes a driver circuit 10, a light intensity sensing circuit 20, and a control circuit 30. The backlight source 200 includes a plurality of LEDs 210 connected in series. A first terminal A and a second terminal B are formed at two ends of the backlight source 200.

The driver circuit 10 includes a driver integrated circuit (IC) 11, a voltage dividing resistor R11 and a feedback resistor R12. In one example, the driver IC 11 may be a TPS61062YZFR circuit. The driver IC 11 includes an input terminal VIN, an output terminal VOUT, a feedback terminal FB, a switch terminal SW, an enable terminal EN, an adjusting terminal ILED, a first ground terminal GND and a second ground terminal PGND.

The first input terminal VIN, the enable terminal EN, and the adjusting terminal ILED are connected to a power supply VBAT which may be supplied by a battery of the electronic device, and also grounded by a first capacitor C11. The first output terminal VOUT is connected to the first terminal A of the backlight source 200 and also grounded by a second capacitor C12. The second terminal B of the backlight source 200 is grounded by the voltage dividing resistor R11. The first output terminal VOUT outputs current to the backlight source 200. The voltage dividing resistor R11 may be a variable resistor. The resistance of the voltage dividing resistor R11 can be changed to adjust a voltage at the backlight source 200.

The feedback terminal FB is connected to the second terminal B by a feedback resistor R12. The feedback terminal FB detects voltage at the second terminal B and adjusts current provided by the first output terminal VOUT according to the detected voltage. The switch terminal SW is connected to the power supply VBAT by an inductor L11. The first ground terminal GND and the second ground terminal PGND are grounded.

The sensing circuit 20 includes a sensing integrated circuit (IC) 21 and an adjusting resistor R21. In one example, the sensing IC 21 may be a CM3204B30R circuit. The sensing IC 21 includes a setting terminal SET, a sensing output terminal VO, a ground terminal GND and a driver input terminal VDD. The setting terminal SET is grounded by the adjusting resistor R21. The adjusting resistor may be a variable resistor. The sensitivity of the sensing IC 21 can be adjusted by changing the resistance of the adjusting resistor R21. The sensing output terminal VO and the ground terminal GNG are grounded. The driver input terminal VDD is connected to the control circuit 30. The sensing IC 21 senses an environmental illumination intensity. When the environmental illumination intensity increases, current consumed by the driver input terminal VDD (i.e., the current input into the driver input terminal VDD) is increased. When the environmental illumination intensity decreases, the current consumed by the driver input terminal VDD (i.e., the current input into the driver input terminal VDD) decreases.

The control circuit 30 includes a transistor Q31, an output resistor R31, a load resistor R32, a first bias resistor R33, and a second bias resistor R34. The first bias resistor R33 and the second bias resistor R34 are connected in series between a power supply VCC and ground. A base of the transistor Q31 is connected to a node between the first bias resistor R33 and the second bias resistor R34, and also grounded by a third capacitor C31. An emitter of the transistor Q31 is connected to the power supply VCC by the load resistor R32. A collector of the transistor Q31 is connected to the feedback terminal FB by the output resistor R31 and also grounded by a fourth capacitor C32. The driver input terminal VDD is connected to the emitter of the transistor Q31.

When the environmental illumination intensity increases, the current input to the driver input terminal VDD is increased. Thus, current flowing through the transistor Q31 is decreased, and current flowing through the feedback transistor R31 is also decreased. A voltage at the feedback resistor R31 is pulled down. When the feedback terminal FB detects the pulled down voltage, the driver IC 11 increases current output from the output terminal VOUT. Therefore, the current flowing through the LEDs 210 is increased, and the illumination intensity of the backlight source 200 is increased.

When the environmental illumination intensity decreases, the current flowing into the driver input terminal VDD is decreased. Thus, current flowing through the transistor Q31 is increased; current flowing through the transistor R31 is also increased. The voltage at the resistor R31 is pulled down. When the feedback terminal FB detects the pulled down voltage, the driver IC 11 increases the current output from the output terminal VOUT. Therefore, the current flowing through the LEDs 210 is decreased and the illumination intensity of backlight source 200 is decreased.

The backlight control circuit 100 can automatically adjust illumination intensity of the backlight source 200 according to the environmental illumination intensity. Thus, information can be clearly displayed on the display when the environmental illumination intensity is strong and the display can save power when the environmental illumination intensity is weak.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A backlight control circuit, comprising:
    a driver circuit that adjusts an illumination intensity of a backlight source;
    a sensing circuit that senses an environmental illumination intensity; and
    a control circuit set between the driver circuit and the sensing circuit, and controlling the driver circuit to adjust the illumination intensity of the backlight source according to the sensed environmental illumination intensity;
    wherein when the environmental illumination intensity increases, current input to the sensing circuit is increased, and the control circuit controls the driver circuit to increase the illumination intensity of the backlight source; when the environmental illumination intensity decreases, the current input to the sensing circuit is decreased, and the control circuit controls the driver circuit to decrease the illumination intensity of the backlight source;
    the driver circuit includes a driver integrated circuit (IC) and a feedback resistor; the driver IC includes an input terminal, an output terminal and a feedback terminal; the input terminal is connected to a power supply, the output terminal is connected to one end of the backlight source and provides power to the backlight source, another end of the backlight source is grounded; the feedback terminal is connected to the another end of the backlight source by the feedback resistor, when a voltage detected by the feedback terminal is pulled down, the current input to the sensing circuit is decreased; when a voltage detected by the feedback terminal is pulled up, the current input to the sensing circuit is increased.

2. The backlight control circuit as claimed in claim 1, wherein the driver circuit further includes a first capacitor and a second capacitor, the first capacitor is set between the input terminal and ground, the second capacitor is set between the output terminal and ground.

3. The backlight control circuit as claimed in claim 1, wherein the sensing circuit includes a sensing IC, the sensing IC includes a setting terminal, an output terminal, a ground terminal and a driver input terminal; the setting terminal, the output terminal and the ground terminal are grounded, the driver input terminal is connected to the control circuit, the current input to the driver input terminal increases when the environmental illumination intensity increases, and decreases when the environmental illumination intensity decreases.

4. The backlight control circuit as claimed in claim 3, wherein the sensing circuit further includes an adjusting resistor set between the driver input terminal and ground.

5. The backlight control circuit as claimed in claim 3, wherein the control circuit includes a transistor, an output resistor, a load resistor, a first bias resistor, and a second bias resistor, the first bias resistor and the second bias resistor are connected in series between a power supply and ground, a base of the transistor is connected to a node between the first bias resistor and the second bias resistor, an emitter of the transistor is connected to the power supply by a load resistor, a collector of the transistor is connected to the feedback terminal by the output resistor, the driver input terminal is connected to the emitter of the transistor.

6. A backlight control circuit, comprising:
    a driver circuit that adjusts an illumination intensity of a backlight source;
    a sensing circuit that senses an environmental illumination intensity; and
    a control circuit set between the driver circuit and the sensing circuit, and controlling the driver circuit to adjust the illumination intensity of the backlight source according to the sensed environmental illumination intensity;
    wherein when the environmental illumination intensity increases, current input to the sensing circuit is increased, and the control circuit controls the driver circuit to increase the illumination intensity of the backlight source; when the environmental illumination intensity decreases, the current input to the sensing circuit is decreased, and the control circuit controls the driver circuit to decrease the illumination intensity of the backlight source;
    the sensing circuit includes a sensing IC, the sensing IC includes a setting terminal, an output terminal, a ground terminal and a driver input terminal; the setting terminal, the output terminal and the ground terminal are grounded, the driver input terminal is connected to the control circuit, the current input to the driver input terminal increases when the environmental illumination intensity increases, and decreases when the environmental illumination intensity decreases.

7. The backlight control circuit as claimed in claim 6, wherein the driver circuit includes a driver integrated circuit (IC) and a feedback resistor; the driver IC includes an input terminal, an output terminal and a feedback terminal; the input terminal is connected to a power supply, the output terminal is connected to one end of the backlight source and provides power to the backlight source, another end of the backlight source is grounded; the feedback terminal is connected to the another end of the backlight source by the feedback resistor, when a voltage detected by the feedback terminal is pulled down, the current input to the sensing circuit is decreased; when a voltage detected by the feedback terminal is pulled up, the current input to the sensing circuit is increased.

8. The backlight control circuit as claimed in claim 7, wherein the driver circuit further includes a first capacitor and a second capacitor, the first capacitor is set between the input terminal and ground, the second capacitor is set between the output terminal and ground.

9. The backlight control circuit as claimed in claim 6, wherein the sensing circuit further includes an adjusting resistor set between the driver input terminal and ground.

10. The backlight control circuit as claimed in claim 6, wherein the control circuit includes a transistor, an output resistor, a load resistor, a first bias resistor, and a second bias resistor, the first bias resistor and the second bias resistor are connected in series between a power supply and ground, a base of the transistor is connected to a node between the first bias resistor and the second bias resistor, an emitter of the transistor is connected to the power supply by a load resistor, a collector of the transistor is connected to the feedback terminal by the output resistor, the driver input terminal is connected to the emitter of the transistor.

* * * * *